(12) United States Patent
Murata et al.

(10) Patent No.: US 6,683,434 B2
(45) Date of Patent: Jan. 27, 2004

(54) DRIVE UNIT FOR BRUSHLESS MOTOR

(75) Inventors: Masato Murata, Toshima-ku (JP); Naruhiko Kudo, Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 70 days.

(21) Appl. No.: 09/965,917

(22) Filed: Sep. 28, 2001

(65) Prior Publication Data

US 2002/0039013 A1 Apr. 4, 2002

(30) Foreign Application Priority Data

Sep. 29, 2000 (JP) ........................................ 2000/301535

(51) Int. Cl.[7] .............................. H02P 1/24; H02P 1/42; H02P 3/18; H02P 5/28; H02P 7/36
(52) U.S. Cl. ...................................................... 318/727
(58) Field of Search ................................ 318/727–765, 318/138, 139

(56) References Cited

U.S. PATENT DOCUMENTS 5,343,127 A * 8/1994 Maiocchi ................... 318/254
5,703,459 A    12/1997 Yasohara et al.
6,256,181 B1   7/2001 Chinomi et al.

FOREIGN PATENT DOCUMENTS

JP    07-322676    12/1995

* cited by examiner

*Primary Examiner*—Jeffrey Donels
(74) *Attorney, Agent, or Firm*—Rankin, Hill, Porter & Clark LLP

(57) ABSTRACT

A drive unit for a brushless motor capable of permitting a rotor to be reliably rotated in a normal or positive direction during starting of the motor. A power control circuit is so constructed that a power feed semiconductor switch may have turn-on time set to a level required or sufficient to permit the rotor to get out of a negative torque region during starting of the brushless motor and turn-off time set to a level sufficient to permit the rotor to race after lapse of the turn-on time. Starting operation by repeat of the turn-on time and turn-off time is carried out at the number of times required to rotate the rotor in a normal or positive direction.

6 Claims, 4 Drawing Sheets

DRIVE UNIT FOR BRUSHLESS MOTOR

BACKGROUND OF THE INVENTION

This invention relates to a drive unit for a brushless motor.

A brushless motor generally includes a stator provided thereon with a plurality of excitation windings and a rotor including a plurality of rotor magnetic poles each constituted by a permanent magnet. The brushless motor thus generally constructed is driven and controlled by a drive unit. A drive unit which has been conventionally used for this purpose generally includes a position detector for detecting a position of the rotor, a rotational speed detecting means for detecting a rotational speed of the rotor, a plurality of excitation changing-over semiconductor switches each connected in series to each of the excitation windings so as to permit an excitation current to flow therethrough to the excitation winding when it is turned on, and a drive circuit for outputting an on/off change-over signal for each of the excitation changing-over semiconductor switches depending on an output of the position detector. The brushless motor has an inherent problem that a dead point must be avoided during starting thereof.

One of approaches to the dead point problem which have been conventionally employed in the art is that imbalance of excitation torque with respect to positive torque in a rotational direction which occurs due to nonuniformity of a gap between the magnetic pole of the stator and the permanent magnet of the rotor is utilized. Another approach is that a control section of the drive circuit is provided with a function of interrupting feeding to the excitation windings in order to prevent burning of the motor during constraint thereof at the dead point.

A timing at which changing-over of phases is carried out is set by detecting a magnetic flux of the permanent magnets of the rotor by means of a hall device. However, an increase in rotational speed of the rotor causes a voltage induced across each of the excitation windings to be increased in proportion thereto. Thus, in order to permit an input current to have a readily controllable waveform, it is often carried out to vary a position of the hall device to shift the timing. This causes a region in which negative torque is generated in a rotational direction of the rotor to appear with respect to a stable point of the rotor during starting of the motor. When it is started at the point as well, a cycle which starts at reverse rotation and returns through arrival at a phase change-over point, normal rotation, arrival at the phase change-over point, reverse rotation and a phase change-over point to normal rotation is repeated. In this instance, positive torque is substantially balanced as compared with negative torque, therefore, normal rotation is normally carried out. However, the control circuit which functions to prevent burning of the motor often judges that such operation indicates abnormality in rotation of the rotor. This causes feeding to the excitation windings to be interrupted, leading to a failure in normal starting of the motor. Also, when a plurality of fan motors each constituting the brushless motor are arranged, reverse rotation of a rotor of one or more of rotors of the fan motors is often caused due to an air pressure generated by the remaining fan motors. This fails in normal rotation of the rotor when a power supply is turned on, leading to operation of the control circuit for preventing burning of the motor. This causes interruption of feeding to the excitation windings, resulting in a failure in normal starting of the motor.

SUMMARY OF THE INVENTION

The present invention has been made in view of the foregoing disadvantage of the prior art.

Accordingly, it is an object of the present invention to provide a drive unit for a brushless motor which is capable of rotating a rotor in a normal or positive direction during starting of the brushless motor.

In accordance with the present invention, a drive unit for a brushless motor which includes a stator provided thereon with a plurality of excitation windings and a rotor including a plurality of rotor magnetic poles each constituted by a permanent magnet is provided. The drive unit generally includes a position detector for detecting a position of the rotor of the brushless motor, a rotational speed detecting means for detecting a rotational speed of the rotor, a plurality of excitation change-over semiconductor switches each connected in series to each of the excitation windings so as to permit an excitation current to flow therethrough to each of the excitation windings when it is turned on, and a drive circuit for outputting an on/off change-over signal for the excitation change-over semiconductor switches depending on an output of the position detector.

One of features of the drive unit generally constructed as described above is that a power feed semiconductor switch is arranged between the excitation windings and a power supply so as to permit power to be fed from the power supply therethrough to the excitation windings when it is turned on and a power control circuit is arranged so as to output a control signal which acts to control on/off operation of the power feed semiconductor switch. The power control circuit is constructed so that the power feed semiconductor switch may have turn-on time set to a level sufficient to permit the rotor to get out of a negative torque region during starting of the brushless motor and turn-off time set to a level sufficient to permit the rotor to race after lapse of the turn-on time, whereby starting operation of the brushless motor by repeat of the turn-on time and turn-off time of the power feed semiconductor switch is carried out at a number of times required for permitting the rotor to be rotated in a normal or positive direction.

The power feed semiconductor switch carries out on/off operation to control power fed to the excitation windings at all times. In the present invention, the above-described control of the turn-on time and turn-off time of the power feed semiconductor switch during starting of the brushless motor permits avoidance of the above-described dead point problem. Alternatively and/or additionally, in the present invention, a control semiconductor switch arranged between the excitation windings and the power supply so as to be exclusively used for permitting feeding of power from the power supply to the excitation windings when it is turned on and a control circuit for outputting a control signal which acts to control on/off operation of the control semiconductor switch may be provided in place of or separately from the power feed semiconductor switch. Such construction likewise permits turn-on time and turn-off time of the control semiconductor switch to be controlled in a like manner. In this instance, when the power feed semiconductor switch is still arranged, it may carry out its normal operation.

In either case, setting of the turn-on time and turn-off time in such a manner as described above permits the rotor to positively get out of a negative torque region, to thereby be rotated in a normal or positive direction, in the case that the rotor is positioned in the negative torque region when the power supply is turned on. Also, when a plurality of brushless fan motors each constituting the brushless motor are arranged, there is a likelihood that one or more of the fan motors are caused to be rotated in an opposite direction by rotation of the remaining fan motors. However, repeat of the above-described operation permits the fan motors rotated in the opposite direction to escape from load due to an air pressure by the remaining fan motors, resulting in the fan motors being positively rotated in the positive direction.

The turn-on time and turn-off time of the semiconductor switch are varied depending on load conditions of the motor and/or operational conditions thereof. However, typically, the turn-on time may be set to be 0.2 second or more and the turn-off time may be set to be 0.05 second or more. Such setting of the turn-on time and turn-off time permits the dead point problem to be effectively eliminated substantially irrespective of the conditions. For a fan motor commonly used for cooling, the turn-on time may be set to be about 0.3 second and the turn-off time may be set to be about 0.1 second. In this instance, the above-described repeat of the turn-on time and turn-off time may be carried out only one time.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Now, a drive unit for a brushless motor according to the present invention will be described with reference to the accompanying drawings.

Figure 1:
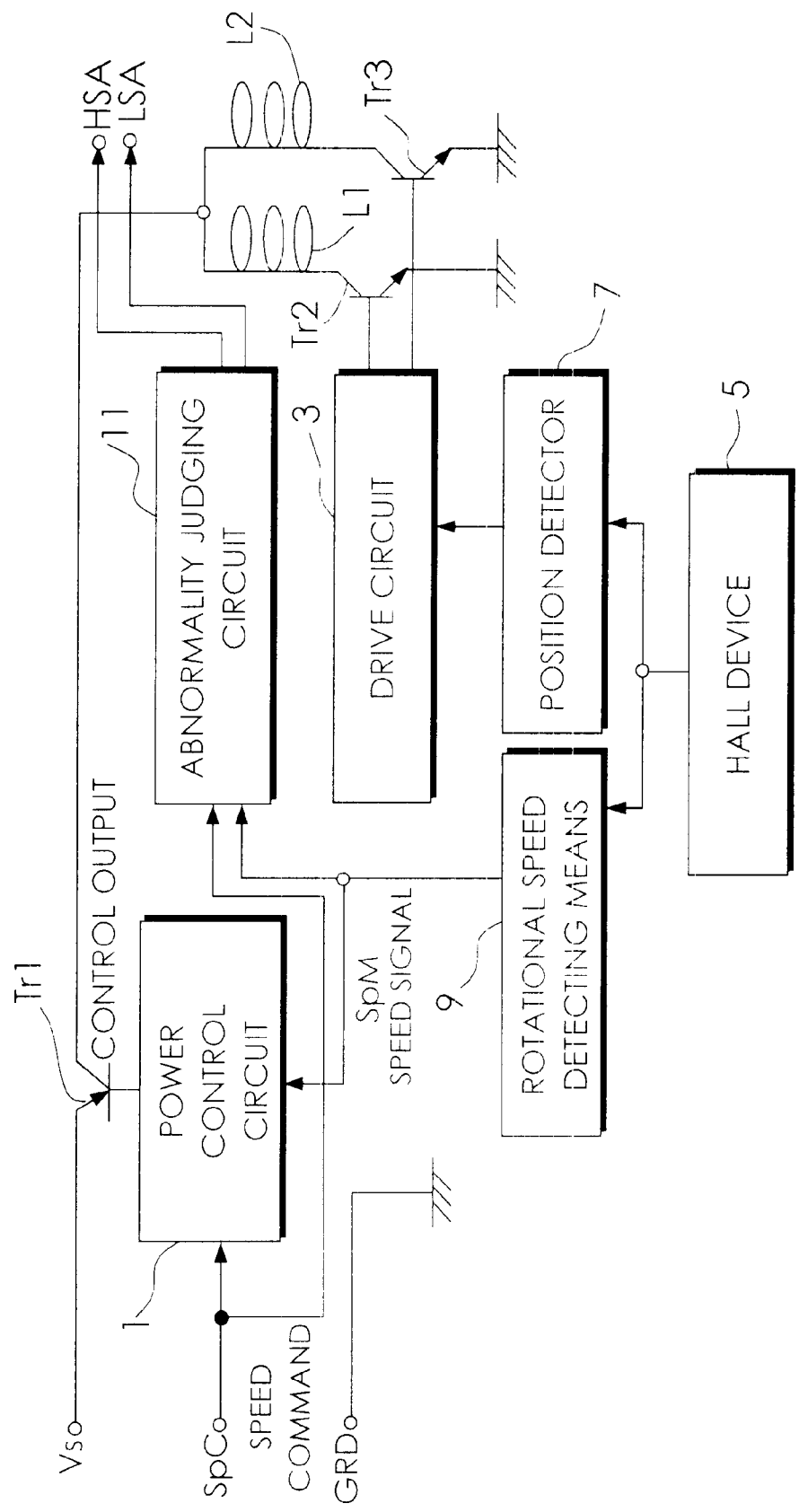
FIG. 1 is a schematic block diagram showing an embodiment of a drive unit for a brushless motor according to the present invention, which is applied to a brushless fan motor.

Referring first to FIG. 1, an embodiment of a drive unit for a brushless motor according to the present invention is illustrated, which is applied to a brushless fan motor by way of example. As commonly known in the art, conventionally a brushless fan motor is constituted by a stator including a plurality of winding sections and a rotor including a plurality of rotor magnetic poles. The winding sections of the stator each are formed by arranging each of excitation windings on each of plural magnetic pole sections (not shown). The rotor magnetic poles each are constituted by a permanent magnet. Flowing of an excitation current to each of the excitation windings of the stator of the brushless fan motor permits attraction force/repulsion force to be generated between the stator and the plural rotor magnetic poles of the rotor constituted by the permanent magnets, leading to rotation of the rotor of the brushless fan motor.

In FIG. 1, reference characters L1 and L2 designate a plurality of excitation windings of a stator. A drive unit for a brushless fan motor of the illustrated embodiment generally includes a power control circuit 1, a drive circuit 3, a hall device 5, a position detector 7, a rotational speed detecting means 9, an abnormality judging circuit 11, a power feed semiconductor switch Tr1, and excitation change-over semiconductor switches Tr2 and Tr3. The position detector 7 is adapted to detect positional relationship between a position of each of rotor magnetic poles of a rotor (not shown) which are constituted by permanent magnets and a position of each of stator magnetic poles of a stator each having an excitation winding wound thereon. The rotational speed detecting means 9 is arranged so as to detect a rotational speed of the rotor depending on an output of the hall device 5.

The excitation change-over semiconductor switches Tr2 and Tr3 are connected in series to the excitation windings L1 and L2 of the brushless fan motor, respectively. The excitation change-over semiconductor switches Tr2 and Tr3 permit an excitation current to flow to the excitation windings L1 and L2 when they are turned on, respectively. The drive circuit 3 is constructed so as to output an on/off change-over signal for the excitation change-over semiconductor switches Tr2 and Tr3 depending on an output of the position detector 7. The power feed semiconductor switch Tr1 permits power to be fed from a power supply Vs to the excitation windings L1 and L2 when it is turned on.

Also, in FIG. 1, reference character SpC designates a speed command, GRD is a ground, LSA is a low-speed alarm generated when rotation of the brushless fan motor does not reach a predetermined rotational speed, and HSA is a high-speed alarm informing that the motor is rotating at a maximum speed. After a rotational speed at which the rotor of the brushless fan motor is rotated is stabilized, comparison between an actual rotational speed of the rotor and a target rotational speed thereof is carried out. The actual rotational speed is obtained in the form of a speed signal SpM by detecting a rotational speed of the rotor through the hall device 5 by means of the rotational speed detecting means 9. The target rotational speed is given in the form of a speed command SpC. Then, the power control circuit 1 of the drive unit compares the speed signal SpM and speed command SpC with each other, to thereby generate a varied control output, resulting in on/off control of the power feed semiconductor switch Tr1 being carried out.

Figure 2:
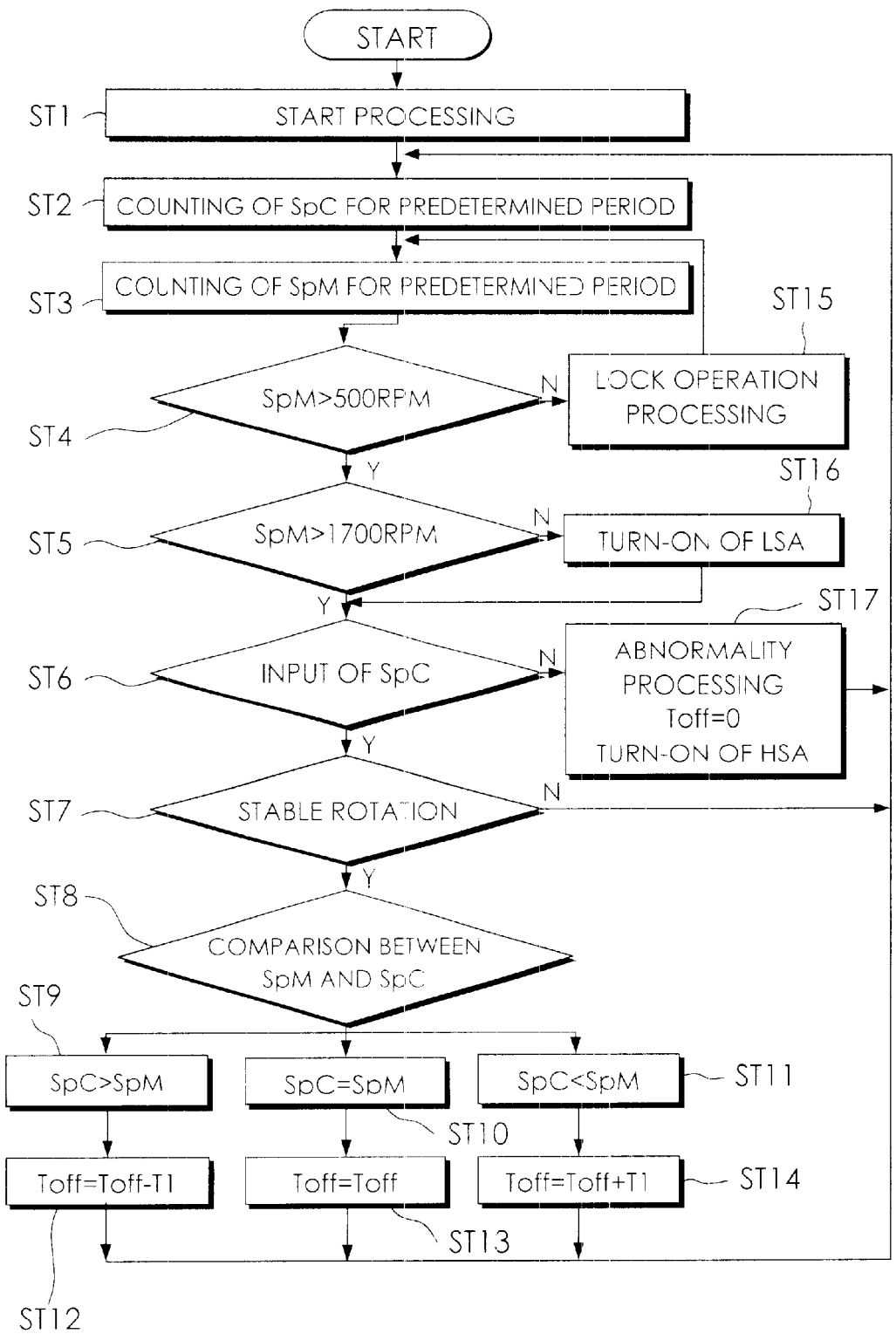
FIG. 2 is a flow chart showing an algorithm of operation of the drive unit shown in FIG. 1.
Figure 3:
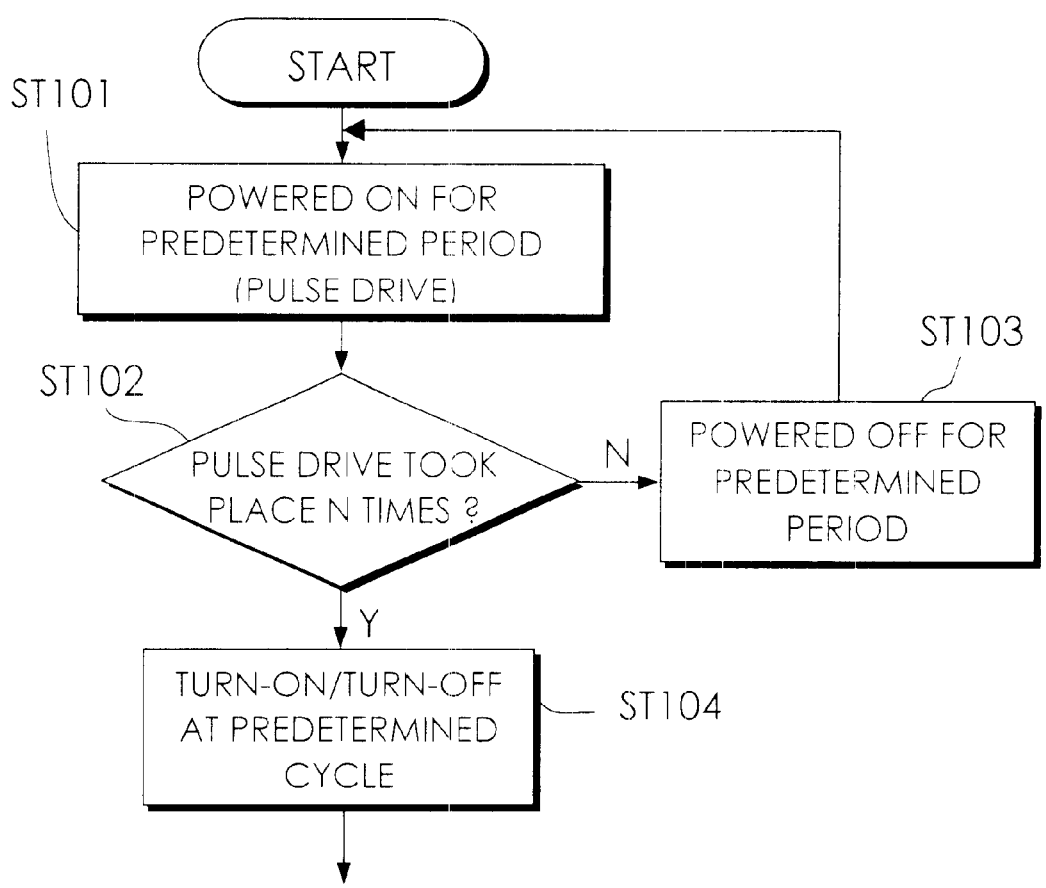
FIG. 3 is a flow chart showing details of a step ST1 in FIG. 2.

Referring now to FIG. 2, an algorithm of a software used for realizing a control section of the drive unit for the brushless fan motor shown in FIG. 1 by means of a microcomputer is illustrated in the form of a flow chart. In the illustrated embodiment, a rotational speed of the rotor is controlled by varying turn-off time of the power feed semiconductor switch Tr1. In FIG. 2, start processing takes place in a step ST1, wherein the power supply is turned on and then the power feed semiconductor switch Tr1 is subjected to on/off control to gradually increase a rotational speed of the brushless fan motor. The start processing carried out in the step ST1 is indicated in detail in FIG. 3. In the start processing, the power feed semiconductor switch Tr1 is turned on for a predetermined period of time (turn-on time) in a step ST101. The turn-on time indicates a period of time which permits the rotor to get out of a negative torque region during starting of the motor. In general, the turn-on time is set to be 0.2 second or more. In the case of a fan motor, it may be considered to be about 0.3 second or less. In the illustrated embodiment, the turn-on time is also expressed in the form of "being powered on for a predetermined period of time". Also feeding during the turn-ontime is referred to as "Pulse drive."

Then, the procedure or operation is advanced from the step ST101 to a step ST102. In the step ST102, it is judged whether pulse drive is executed a predetermined number of times N. When the pulse drive is not carried out N times, the procedure is advanced to a step ST103. In the step ST103, the power feed semiconductor switch Tr1 is turned off for a predetermined period of time (turn-off time) after lapse of the turn-on time. The turn-off time is set to be a period of time which permits the rotor to race several times after lapse of the turn-on time. The operation between the step ST101 and the step ST103 is repeated until the pulse drive is carried out predetermined N times. The numeral N is determined as desired depending on a load condition. Even when N is one (1) or the turn-on time and turn-off time each are set one time, normal starting may be generally carried out without any trouble. An optimum value of each of the turn-on time, turn-off time and N may be readily set through tests or experiments previously carried out. When the pulse drive is completed N times in the step ST102, the operation is advanced to a step ST104, so that feed of power at a predetermined level to the excitation windings L1 and L2 in a relatively short cycle may be started without varying the turn-off time of the power feed semiconductor switch Tr1, followed by advancing to a step ST2.

In the step ST2, the speed command SpC is counted for a predetermined period of time, resulting in a value of the speed command SpC being known. During the time, the turn-off time and turn-on time of the power feed semiconductor switch Tr1 each are set at a predetermined fixed value until a rotational speed of the rotor is stabilized. Then, the operation is advanced to a step ST3. In the step ST3, the speed signal SpM is counted for a predetermined period of time, so that a value of the speed signal SpM may be known. In the step ST3 as well, the turn-off time and turn-on time of the power feed semiconductor switch Tr1 each are set at a predetermined fixed value until a rotational speed of the rotor is stabilized.

Then, the operation is advanced to steps ST4 to ST6, wherein a condition of rotation of the brushless fan motor is judged depending on the value of the speed signal SpM obtained in the step ST3. More particularly, in the step ST4, the brushless fan motor is judged to be in a locked condition when the speed signal SpM is at a level of, for example, 500 RPM or less, so that the operation is advanced to lock operation processing in a step ST 15, resulting in being returned to the step ST3. When the speed signal SpM exceeds, for example, 500 RPM, the brushless fan motor is judged to be in a condition of normal rotation, so that the operation is advanced to the step ST5. In the step ST5, judgment that the fan motor is delayed in rising of rotation thereof is made when the speed signal SpM is at a level of, for example, 1700 RPM or less, so that the operation is advanced to a step ST16. In the step ST16, the low-speed alarm LSA described above is outputted, resulting in the operation being advanced to the step ST6. Also when the speed signal SpM exceeds, for example, 1700 RPM, the operation is advanced to the step ST6. In the step ST6, input of the speed command SpC is checked. When the input is not detected, it is judged that abnormal processing is required, so that the operation is transferred to a step ST17, followed by returning to the step ST2.

Transfer to the step ST 17 is carried out, for example, when any abnormal condition in which the speed command is not inputted for any reason occurs although the rotation is carried out at a normal rotational speed under normal conditions which is composed or calm as compared with a maximum rotational speed, to thereby ensure that turn-off time Toff of the power feed semiconductor switch Tr1 is suitably set. When the brushless fan motor falls into such an abnormal condition, the turn-off time Toff of the power feed semiconductor switch Tr1 is rendered zero, to thereby rotate the brushless fan motor at the maximum rotational speed. At this time, the high-speed alarm HSA is turned on, resulting in informing the abnormality.

When input of the speed command SpC is detected as a result of checking of the input in the step ST6, the operation is advanced to a step ST7. In the step ST7, it is judged whether the brushless fan motor falls into a condition of stable rotation. For example, the stability may be judged depending on whether a rotational speed of the fan motor has reached 250 rpm. When rotation of the fan motor is judged to be unstable, the operation is returned to the step ST2. When it is judged to be stable, the operation is advanced to a step ST8. In the step ST8, the speed command SpC and speed signal SpM obtained in the steps ST2 and ST3 are compared with each other. Then, the operation is advanced to anyone of steps ST9 to ST11 depending on a result of the comparison. More particularly, when the speed command SpC is judged to be larger than the speed signal SpM as a result of comparison between both, the operation is advanced to the step ST9. In the step ST9, the turn-off time of the power feed semiconductor switch Tr1 is reduced by time T1. The time T1 may be set to be, for example, 2 μs or more. When the speed command SpC and speed signal SpM are judged to be equal to each other, the operation is advanced to the step ST10. In the step ST10, the turn-off time Toff of the power feed semiconductor switch Tr1 is kept unvaried. When the speed command SpC is judged to be smaller than the speed signal SpM, the operation is advanced to the step ST11. In the step ST11, the turn-off time Toff of the power feed semiconductor switch Tr1 is increased by the time T1. Then, when steps ST12 to ST14 are completed, the operation is returned to the step ST2. Speed control carried out in such a manner as described above permits the rotation to rapidly reach a target rotational speed. Also, it permits the rotation to be smoothly carried out while being reduced in overshoot after it has reached the target speed.

The illustrated embodiment, as described above, is so constructed that the turn-off time of the power feed semiconductor switch Tr1 is varied to control a rotational speed of the fan motor. Alternatively, in the illustrated embodiment, the turn-on time rather than the turn-off time may be varied to control the rotational speed. In this instance, in FIG. 2, the turn-on time Ton of the power feed semiconductor switch Tr1 is substituted for the turn-off time Toff thereof in the steps ST12 to ST14. Also, a sign of the time T1 is reversed. More specifically, a positive sign + is changed into a negative sign – and a negative sign – is changed into a positive sign +. Further, the turn-off time Toff=0 in the step ST17 is changed into the maximum turn-on time Ton.

Figure 4:
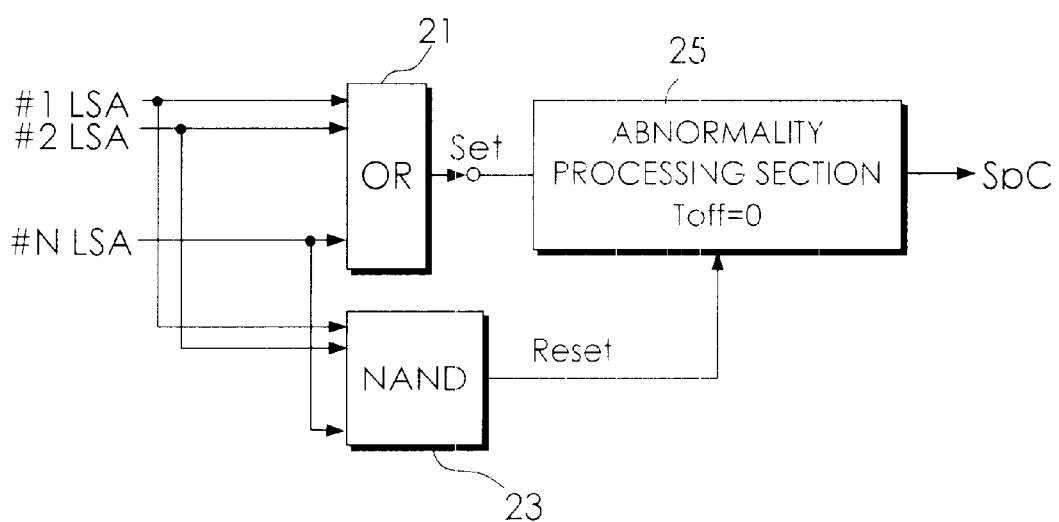
FIG. 4 is a schematic diagram showing a control section for controlling a plurality of brushless fan motors.

Referring now to FIG. 4, a control section which may be employed when a plurality of the brushless fan motors are connected in parallel to each other is illustrated. In FIG. 4, the plural fan motors each are rotated at a normal rotational speed smaller than a maximum rotational speed, during which time when at least one of the fan motors is stopped, the remaining fan motors are rotated at the maximum rotational speed. In FIG. 4, reference numeral 21 designates an OR circuit, 23 is a NAND circuit and 25 is an abnormality processing section. Low-speed alarms #1LSA, #2LSA . . . #NLSA are collected from the plural brushless fan motors (of N in number) and inputted to the OR circuit 21 and NAND circuit 23. An output of the OR circuit 21 indicates that an alarm is outputted from at least one of drive units and acts as a set signal for the abnormality processing section 25. An output from the NAND circuit 23 indicates that an alarm is outputted from none of the drive units and acts as a reset signal for the abnormality processing section 25. An output of the abnormality processing section 25 is transmitted in the form of the speed command SpC to all fan motors.

In the illustrated embodiment, on/off operation is carried out by means of the power feed semiconductor switch Tr1.

When the power feed semiconductor switch Tr1 is not used for this purpose, the illustrated embodiment maybe constructed in such a manner that a control semiconductor switch arranged between the excitation windings and the power supply so as to be exclusively used for permitting feeding of power from the power supply to the excitation windings when it is turned on and a control circuit for outputting a control signal which acts to control on/off operation of the control semiconductor switch may be provided in place of or separately from the power feed semiconductor switch. Such construction likewise permits turn-on time and turn-off time of the control semiconductor switch to be controlled in a manner described above. In this instance, when the power feed semiconductor switch is still arranged, it may carry out its normal operation.

As can be seen form the foregoing, the present invention is constructed so as to set the turn-on time and turn-off time during starting of the brushless motor. Such construction permits the rotor to positively get out of a negative torque region during starting of the brushless motor, to thereby be rotated in a positive direction, even when it is positioned in the negative torque region when the power supply is turned on.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A drive unit for a brushless motor including a stator provided thereon with a plurality of excitation windings and a rotor including a plurality of rotor magnetic poles each constituted by a permanent magnet, comprising:

a position detector for detecting a position of the rotor of the brushless motor;

a rotational speed detecting means for detecting a rotational speed of the rotor;

a plurality of excitation change-over semiconductor switches each connected in series to each of the excitation windings so as to permit an excitation current to flow therethrough to each of the excitation windings when it is turned on;

a drive circuit for outputting an on/off change-over signal for said excitation change-over semiconductor switches depending on an output of said position detector;

a power feed semiconductor switch arranged between the excitation windings and a power supply so as to permit power to be fed from said power supply therethrough to the excitation windings when it is turned on; and a power control circuit for outputting a control signal which acts to control on/off operation of said power feed semiconductor switch;

said power control circuit being constructed so that said power feed semiconductor switch may have turn-on time set to a level sufficient to permit the rotor to get out of a negative torque region during starting of the brushless motor and turn-off time set to a level sufficient to permit the rotor to race after lapse of the turn-on time;

whereby starting operation by repeat of the turn-on time and turn-off time is carried out at a number of times required for permitting the rotor to be rotated in a positive direction.

2. A drive unit as defined in claim 1, wherein said turn-on time is set to be 0.2 second or more and said turn-off time is set to be 0.05 second or more.

3. A drive unit as defined in claim 2, wherein said turn-on time is set to be about 0.3 second and said turn-off time is set to be about 0.1 second; and said repeat of said turn-on time and turn-off time is carried out one time.

4. A drive unit for a brushless motor which includes a stator provided thereon with a plurality of excitation windings and a rotor including a plurality of rotor magnetic poles each constituted by a permanent magnet, comprising:

a position detector for detecting a position of the rotor of the brushless motor;

a rotational speed detecting means for detecting a rotational speed of the rotor;

a plurality of excitation change-over semiconductor switches each connected in series to each of the excitation windings so as to permit an excitation current to flow therethrough to each of the excitation windings when it is turned on; and a drive circuit for outputting an on/off change-over signal for said excitation change-over semiconductor switches depending on an output of said position detector;

a control semiconductor switch arranged between the excitation windings and a power supply so as to permit power to be fed from said power supply therethrough to the excitation windings when it is turned on; and a control circuit for outputting a control signal which acts to control on/off operation of said control semiconductor switch;

said control circuit being constructed so that said control semiconductor switch may have turn-on time set to a level sufficient to permit the rotor to get out of a negative torque region during starting of the brushless motor and turn-off time set to a level sufficient to permit the rotor to race after lapse of the turn-on time;

whereby starting operation by repeat of the turn-on time and turn-off time is carried out at a number of times required for permitting the rotor to be rotated in a positive direction.

5. A drive unit as defined in claim 4, wherein said turn-on time is set to be 0.2 second or more and said turn-off time is set to be 0.05 second or more.

6. A drive unit as defined in claim 5, wherein said turn-on time is set to be about 0.3 second and said turn-off time is set to be about 0.1 second; and said repeat of said turn-on time and turn-off time is carried out one time.

* * * * *